(12) United States Patent
Chung et al.

(10) Patent No.: US 7,630,380 B2
(45) Date of Patent: Dec. 8, 2009

(54) APPARATUS AND METHOD FOR SCHEDULING RESOURCES IN A MULTIANTENNA SYSTEM

(75) Inventors: Jae-Hak Chung, Seoul (KR); Ji-Won Kang, Seoul (KR); Ye-Hoon Lee, Suwon-si (KR); Seung-Hoon Nam, Seoul (KR); Chung-Yong Lee, Seoul (KR); Hak-Ju Lee, Incheon (KR)

(73) Assignees: Samsung Electronics Co., Ltd (KR); Yonsei University (KR)

( * ) Notice: Subject to any disclaimer, the term of this patent is extended or adjusted under 35 U.S.C. 154(b) by 545 days.

(21) Appl. No.: 11/392,407

(22) Filed: Mar. 29, 2006

(65) Prior Publication Data

US 2006/0268814 A1 Nov. 30, 2006

(30) Foreign Application Priority Data

Mar. 29, 2005 (KR) .................. 10-2005-0026196

(51) Int. Cl.
*H04L 12/28* (2006.01)
(52) U.S. Cl. .................. 370/395.4; 370/252; 370/442
(58) Field of Classification Search .................. 370/347, 370/345, 310, 395.4, 395.41, 442; 455/561, 455/550.1, 73, 450, 509
See application file for complete search history.

(56) References Cited

U.S. PATENT DOCUMENTS

| 2002/0183084 A1* | 12/2002 | Wu et al. ..................... 455/509 |
| 2003/0123425 A1 | 7/2003 | Walton et al. |
| 2006/0121946 A1* | 6/2006 | Walton et al. ............... 455/561 |
| 2008/0069031 A1* | 3/2008 | Zhang et al. ................ 370/328 |

FOREIGN PATENT DOCUMENTS

WO       WO 03/041300       5/2003

\* cited by examiner

*Primary Examiner*—Ricki Ngo
*Assistant Examiner*—Kan Yuen
(74) *Attorney, Agent, or Firm*—The Farrell Law Firm, LLP

(57) ABSTRACT

Provided is a scheduling apparatus and method for allocating resources to individual users in a multiantenna system. The method includes determining a ratio of time slots to be allocated according to a ratio desired by each of the terminals in every specific time slot interval, calculating a channel capacity average and a standard deviation for each terminal according to channel capacity reported from each terminal for a specific time, and determining, based on the determined ratio of time slots, a terminal to which a specific time slot is to be allocated according to the channel capacity average and the standard deviation, calculated for each terminal, and the last reported channel capacity.

8 Claims, 9 Drawing Sheets

USER A

USER B

USER C

APPARATUS AND METHOD FOR SCHEDULING RESOURCES IN A MULTIANTENNA SYSTEM

PRIORITY

This application claims the benefit under 35 U.S.C. § 119(a) of an application entitled "Apparatus and Method for Scheduling Resource in a Multiantenna System" filed in the Korean Intellectual Property Office on Mar. 29, 2005 and assigned Serial No. 2005-26196, the entire contents of which are hereby incorporated by reference.

BACKGROUND OF THE INVENTION

1. Field of the Invention

The present invention relates generally to an apparatus and method for scheduling resources in a multiantenna system, and in particular, to an apparatus and method for scheduling resources for individual users in a multiantenna system.

2. Description of the Related Art

In general, the wireless channel environment, unlike the wire channel environment, exhibits low reliability due to multipath interference, shadowing, propagation attenuation, time-varying noise, interference, etc. this low reliability prevents the mobile communication from increasing its data rate. Many technologies for solving this problem have been developed. Two typical technologies are an error-control coding technique for controlling influences of signal distortion and noise, and a diversity technique for coping with fading.

The diversity technique copes with the fading by receiving several signals that underwent independent fading. Commonly, methods for obtaining the diversity effect include time diversity, frequency diversity, multipath diversity, and spatial diversity.

The time diversity, by being combined with channel coding and interleaving, obtains a time diversity gain. The frequency diversity, in which signals transmitted at different frequencies undergo different multipath signals, obtains a frequency diversity gain. The multipath diversity obtains a multipath diversity gain by separating multipath signals using different fading information. The spatial diversity, which uses several antennas for one of both or a transmitter and a receiver, obtains a spatial diversity gain by independent fading signals. The spatial diversity uses an antenna array.

A system using the antenna array (hereinafter referred to as an "antenna array system"), in which multiple antennas are included in a transmitter/receiver, aims at increasing frequency efficiency using spatial regions. The use of the spatial regions, compared with the use of the limited time regions and frequency regions, can obtain a higher data rate. The antenna array system is also known as a multiantenna system. Antennas constituting the antenna array system each transmit their independent information. Fundamentally, therefore, the antenna array system corresponds to a Multi Input Multi Output (MIMO) system.

Since the antenna array system has high frequency efficiency, in order to extend the system capacity, a correlation coefficient formed between transmission antennas and reception antennas should be low. When operating at the low inter-channel correlation coefficient, the information transmitted from the respective transmission antennas transmit over different channels, so a mobile station can distinguish the transmitted information. That is, the signals sent from the respective transmission antennas should have different spatial characteristics in order to be distinguished, contributing to extension of the channel capacity. In addition, the antenna array system is suitable for places where many multipath signals having different spatial characteristics. However, in a Line-of-Sight (LOS) environment, the antenna array system is not superior to the single-transmission/reception antenna system in terms of the increase in capacity. The antenna array system is suitable for environments where there are many multiple paths because of many scattering objects between a transmitter and a receiver, and especially suitable for the environment in which transmission/reception antenna channels have low correlation coefficients, i.e., the environment having the diversity effect.

In the antenna array system, a receiver provides channel state information to a transmitter. The channel state information needed in the antenna array system includes channel responses between the transmission antennas and the reception antennas. Therefore, the amount of the channel state information is proportional to the number of transmission/reception antennas.

The transmitter of the antenna array system requires scheduling of the resources to be allocated to individual users in order to maximize efficient use of the limited resources. The scheduling of resource allocation is achieved based on the channel state information provided from the receiver.

A Best User Selection (BUS) scheduler is a typical scheduling technique used to obtain a multiuser diversity gain in the conventional antenna array system environment supporting multiple users. The BUS scheduler transmits data to a user having the maximum channel capacity in each scheduling interval. If the total number of users is denoted by K, the BUS scheduler allocates resource $k_{BUS}^*(t)$ to each individual user in accordance with Equation (1).

$$k_{BUS}^*(t) = \arg\max_{k=1,\ldots,K} C_k(t) \qquad (1)$$

where $C_k(t)$ denotes channel capacity for a user k at a time t.

FIG. 1 is a diagram illustrating a configuration of an antenna array system for allocating resources to individual users using a conventional BUS scheduler.

Referring to FIG. 1, users User 1 120, User 2 122, . . . , User K 124 send to a base station channel state information $C_k(t)$ (k=1, . . . , K) determined by taking channel characteristics into account. The channel state information $C_k(t)$ (k=1, . . . , K) for the individual users is provided to a packet scheduler 110 in the base station. The packet scheduler 110 determines resource $k_{BUS}^*(t)$ to be allocated to each individual user in accordance with Equation (1) by taking into account the channel state information $C_k(t)$ (k=1, . . . , K) for the individual users.

The resource $k_{BUS}^*(t)$ allocated to the individual user is provided to a buffer 112. The buffer 112 is a queue for temporarily storing the packets to be transmitted to individual users. The buffer 112 outputs the stored transmission packets for the individual users with the resources $k_{BUS}^*(t)$ allocated to the individual users. The transmission packets output from the buffer 112 are provided to a coding and adaptive modulation unit 114. The packets to be transmitted to the individual users undergo coding and modulation based on a specific modulation scheme in the coding and adaptive modulation unit 114. The modulation scheme is adaptively changed according to the channel state information provided for the individual users.

The modulation symbols to be transmitted to the individual users are multiplexed by a spatial multiplexer 116 with modulation symbol streams, the number of which is equal to the number of transmission antennas. The modulation symbol streams multiplexed by the spatial multiplexer 116 are transmitted to the individual users via their associated transmission antennas.

The multiantenna system supporting multiple users, shown in FIG. 1, has unique channel characteristics $H_1(t)$, $H_2(t), \ldots, H_K(t)$ between the base station and the users. The users 120, 122 and 124 determine channel state information $C_k(t)$ (k=1, ..., K) taking their own channel characteristics into account, and feed back to the base station the channel state information.

The foregoing conventional BUS scheduler allocates more resources to a user having higher average channel capacity when there is a difference in average channel capacity between users, so fair resource allocation cannot be achieved for the respective users. That is, the user having a bad average channel state can be allocated almost no resources.

SUMMARY OF THE INVENTION

In order to solve this problem, research is being conducted on techniques for guaranteeing the fairness in addition to a multiuser diversity technique. The typical techniques include a Proportional Fair (PF) technique and a Weighted Proportional Fair (WPF) technique. However, for the conventional techniques, no research has been conducted on a quantitative criterion for controlling resource (time slot) allocation in the ratio desired by the system operator, and a method and algorithm therefor.

It is, therefore, an object of the present invention to provide an apparatus and method for allocating resources to individual users in an optimal ratio in a multiantenna system supporting multiple users.

It is another object of the present invention to provide a quantitative criterion for controlling resource allocation desired by individual users in a multiantenna system supporting multiple users.

It is further another object of the present invention to provide a scheduling apparatus and method for allocating resources to individual users in a desired ratio while obtaining a multiuser diversity gain in a multiantenna system supporting multiple users.

It is yet another object of the present invention to provide a scheduling apparatus and method for allocating time slots to individual users in a desired ratio in a multiantenna system supporting multiple users.

According to one aspect of the present invention, there is provided a method for allocating resources to individual terminals by a base station in a multiantenna system supporting multiple users. The method includes determining a ratio of time slots to be allocated to each terminal in every time slot interval; calculating a channel capacity average and a standard deviation for each terminal according to channel capacity reported from each terminal for a specific time; and determining, based on the determined ratio of time slots, a terminal to which a specific time slot is to be allocated according to the channel capacity average and the standard deviation, calculated for each terminal, and the last reported channel capacity.

According to another aspect of the present invention, there is provided an apparatus for allocating resources to individual terminals by a base station in a multiantenna system supporting multiple users. The apparatus includes a ratio decision unit for determining a ratio of time slots to be allocated to each terminal in every time slot interval; a coefficient calculator for determining coefficients serving to adjust time slot allocation for each terminal according to the determined ratio of time slots; and a packet scheduler for calculating a channel capacity average and a standard deviation for each terminal according to channel capacity reported from each of the terminals for a specific time, and determining a terminal to which a specific time slot is to be allocated according to the coefficients, the channel capacity average and the standard deviation, calculated for each terminal, and the last reported channel capacity.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

According to the present invention, an upper layer determines the resource allocation to respective users over a long term, and provides the ratio to a scheduler. Then the scheduler determines coefficients appropriate for the provided ratio using an equation proposed herein. On the assumption that a statistical channel characteristic for a user is constant for a predetermined time, it is possible to determine a channel capacity average and a standard deviation for the user while continuously updating them mathematically or for a predetermined time interval. Resource allocation for individual users is scheduled by substituting the channel capacity average and standard deviation values, which are the statistical characteristic values, and instantaneous channel capacity fed back for the individual users into an equation proposed herein, together with the coefficient values found above. In this case, the resource allocation allocates time slots to the user having the highest value among the values found by the equation proposed herein.

The scheduling technique proposed herein can allocate time slots in the ratio desired by each individual user, together with the multiuser diversity gain. To this end, the scheduling technique performs scheduling with an algorithm given in Equation (2) using Gaussian approximation for the channel capacity.

$$k^*(t) = \arg\max_{k=1,\ldots,K} \sigma_k \times \frac{C_k(t) - C_k^{av}}{C_k^{std}} + m_k \quad (2)$$

where $C_k(t)$ denotes channel capacity of the current time slot, $C_k^{av}$ denotes a channel capacity average of a user k, and $C_k^{std}$ denotes a standard deviation for the channel capacity of the user k. Here, $\sigma_k$ and $m_k$ denote coefficients serving to adjust time slots such that the time slots are allocated to the user k in the desired ratio.

When the desired ratio is determined, there are numerous possible coefficients. In this case, there is a need for a sub-optimal scheduler capable of finding the coefficients without an integration calculation and tabling of the coefficients. To meet the need, the present invention proposes a Control Variance (CV) scheduler that sets to '0' an average of cost functions for all users. The CV scheduler performs scheduling with an algorithm given by $$k_{CV}^*(t) = \arg\max_{k=1,\ldots,K} \sigma_k \times \frac{C_k(t) - C_k^{av}}{C_k^{std}} \quad (3)$$

As described above, in Equation (3), the CV scheduler determines a variance $\sigma_k$ after setting an average of cost functions for all users to '0' ($m_k=0$).

Figure 1:
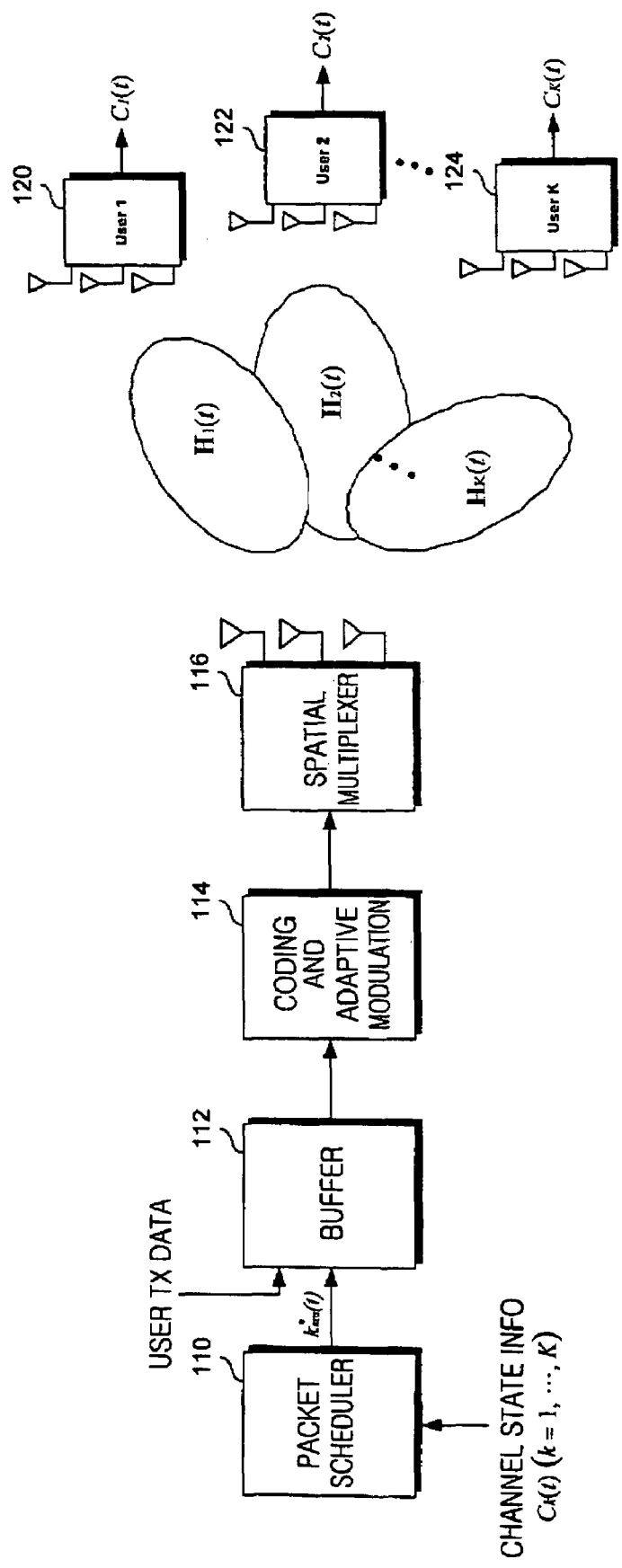
FIG. 1 is a diagram illustrating a configuration of an antenna array system for allocating resources to individual users using a conventional BUS scheduler.
Figure 2:
FIG. 2 is a diagram illustrating an example in which time slots are allocated to individual users according to the present invention.
Figure 2:
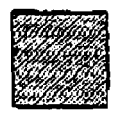
Figure 2:
Figure 2:

FIG. 2 is a diagram illustrating a concept of the present invention for allocating time slots to individual users in a desired ratio while obtaining a multiuser diversity gain. FIG. 2 illustrates an example in which 12 time slots are allocated to users A, B and C in the ratio of 3:4:5. As shown in FIG. 2, resource allocation is achieved such that the time slots are allocated to the individual users in the desired ratio in a predetermined time slot interval instead of being regularly allocated to the individual users.

The present invention is based on the fact that when the number of antennas increases, channel capacity of the multi-antenna system approximates a Gaussian distribution. Referring to Equation (4), a value at a particular time slot $t_0$ is set as given in $$\sigma_k \times \frac{C_k(t_0) - C_k^{av}}{C_k^{std}} + m_k = X_k \quad, k=1,\ldots,K \quad (4)$$

where $X_k$ can approximate a random variable having a Gaussian distribution of $N(m_k, \sigma_k^2)$.

Therefore, a selection probability for a user k can be determined by $$P_k(m_1,\ldots,m_K,\sigma_1,\ldots,\sigma_K) = Pr(X_k \text{ is maximal}) \quad (5)$$

$$= \int_{-\infty}^{\infty} \frac{1}{\sqrt{2\pi}\,\sigma_k} e^{-\frac{(x-m_k)^2}{2\sigma_k^2}}$$

-continued $$\prod_{\substack{i=1\\i\neq k}}^{K}\left(0.5 + 0.5\,\text{erf}\left(\frac{x-m_i}{\sqrt{2}\,\sigma_i}\right)\right)dx$$

If a ratio of time slots desired to be allocated to each user is defined by $P_k^*$ (k=1,...,K), it is possible to allocate the time slots in the desired ratio by finding coefficients satisfying $P_k(m_1,\ldots,m_K,\sigma_1,\ldots,\sigma_K)=P_k^*$ (k=1,...,K) in Equation (5). That is, K simultaneous equations are solved. In this case, because the number of the coefficients is twice the number of the equations, there are numerous sets of coefficients that can be allocated in the desired ratio.

When scheduling is performed in the manner proposed by the present invention, an average channel capacity gain for the user k can be calculated by $$C_k^{sel.av} = \frac{C_k^{std}}{\sigma_k}(X_k^{sel.av} - m_k) + C_k^{av} \quad (6)$$

where $X_k^{sel.av}$ is defined as $$X_k^{sel.av} = E[X_k \mid X_k \text{ is maximal}] \quad (7)$$

$$= \int_{-\infty}^{\infty} x \frac{Pr(X_k \text{ is maximal} \mid X_k = x)}{Pr(X_k \text{ is maximal})} \frac{1}{\sqrt{2\pi}\,\sigma_k} e^{-\frac{(x-m_k)^2}{2\sigma_k^2}} dx$$

$$= \frac{1}{P_k^*}\int_{-\infty}^{\infty} \frac{x}{\sqrt{2\pi}\,\sigma_k} e^{-\frac{(x-m_k)^2}{2\sigma_k^2}} \prod_{\substack{i=1\\i\neq k}}^{K}\left(0.5+0.5\,\text{erf}\left(\frac{x-m_i}{\sqrt{2}\,\sigma_i}\right)\right)dx$$

Because $X_k^{sel.av}$ of Equation (7) is always greater than $m_k$, it is possible to prove by Equation (6) that all users obtain a gain at the average channel capacity, i.e., a scheduling gain, due to the scheduling scheme proposed herein. Using the foregoing equations, it is also possible to determine the overall system capacity through scheduling in accordance with Equation (8).

$$C_{system}(m,\sigma) = \quad (8)$$

$$\sum_{k=1}^{K} P_k^* C_k^{sel.av} = \sum_{k=1}^{K} P_k^* \frac{C_k^{std}}{\sigma_k}\{X_k^{sel.av}(m,\sigma,P_k^*) - m_k\} + \sum_{k=1}^{K} P_k^* C_k^{av}$$

where m and $\sigma$ mean $[m_1,\ldots,m_K]^T$ and $[\sigma_1,\ldots,\sigma_K]^T$, respectively, and $X_k^{sel.av}$ indicates a function of the vectors m and $\sigma$ and a desired ratio $P_k^*$. In Equation (8), because the rear term is identical to the system capacity that can be obtained by a weighted round-robin scheme, the multiuser diversity corresponding to the front term is obtained.

As described above, the scheduler proposed in the present invention can be defined in numerous types. Among them, the scheduler that maximizes the overall system capacity is given by $$k_{opt.}^*(t) = \arg\max_{k=1,\ldots,K} C_k(t) + v_k \quad (9)$$

Generally, $v_k$ is difficult to directly determine, but even this optimal scheduler is included in a category of the scheduler proposed in the present invention. Therefore, it is possible to find the coefficients in accordance with Equation (9). However, the above scheduler should determine the coefficients according to the channel state ($\sigma_k = C_k^{std}$) because the coefficients are dependent on the statistical characteristic of the channel. In addition, in order to use Equation (9) in the actual system, the scheduler should use an approximation technique for integration. Also, this becomes a great burden to perform calculation in real time.

Therefore, the present invention proposes a CV scheduler expressed as Equation (3) as a sub-optimal scheduler. The CV scheduler has an excellent characteristic that the statistical characteristics and coefficients of the channels are independent, because an average of cost functions for all users is '0'. When the average is set to '0' in this way, Equation (5) can be expressed as $$P_k = \frac{1}{2^{K-2}} \quad (10)$$

$$\sum_{l=0}^{2\lfloor(K-1)/2\rfloor} \left[ \sum_{i=0}^{\lfloor(K-1-2\lfloor l/2\rfloor)/2\rfloor} \binom{K-1-l}{2i+l-2\lfloor l/2\rfloor} \right] (-1)^l \sum_{\forall \Omega_{k,l}} \Phi_k(\Omega_{k,l})$$

where $\Phi_k(\Omega_{k,l}) = \int_0^\infty \frac{1}{\sigma_k \sqrt{2\pi}} \exp\left(-\frac{x^2}{2\sigma_k^2}\right) \prod_{\forall i \in \Omega_{k,l}} \mathrm{erfc}\left(\frac{x}{\sqrt{2}\,\sigma_i}\right) dx$ Herein, $\lfloor \cdot \rfloor$ denotes Gaussian calculation indicating the maximum integer which is less than or equal to a corresponding number, and $$\binom{n}{k}$$

denotes the number of possible cases where k elements are selected from n elements. Further, $\Omega_{k,l}$ denotes a partial set where the number of elements is l, in the full set having all integers of 1 to K except for k as its elements.

It is possible to remove all integrations in Equation (10) by using an approximation equation for a complementary error function. For example, the complementary error function can be approximated in accordance with Equation (11).

$$\mathrm{erfc}(x) \approx a_1 e^{\frac{x^2}{\sin^2\theta}} + a_2 e^{-x^2} \begin{cases} \text{approximation } a_1 = 0.5, a_2 = 0.5 - \theta/\pi \\ \text{upper bound: } a_1 = 2\theta/\pi, a_2 = 1 - 2\theta/\pi \end{cases} \quad (11)$$

Herein, $a_1=0.5$, $a_2=0.5-\theta/\pi$ when the approximation of the complementary error function is used as a function of $\theta$, and $a_1=2\theta/\pi$, $a_2=1-2\theta/\pi$ when the approximation of the complementary error function is used as an upper bound. In this case, a function $\Phi_k(\Omega_{k,l})$ is approximated to $$\Phi_k(\Omega_{k,l}) \approx \sum_{i=0}^{l} \frac{1}{2\sigma_k} a_1^i a_2^{l-i} \left( \sum_{\forall \tilde{\sigma}_l \in \Psi_{l,i}} \frac{1}{\sqrt{1/\sigma_k^2 + \tilde{\sigma}_l^T \tilde{\sigma}_l}} \right) \quad (12)$$

Herein, when a size-l vector having $\sigma_{j_n}$ corresponding to $j_n$ (n=1, ..., l) for $\Omega_{k,l}=\{j_1, \ldots, j_l\}$ as its element is defined as $\sigma_l = [\sigma_{j_1}\, \sigma_{j_2} \cdots \sigma_{j_l}]^T$, $\tilde{\sigma}_l$ is defined as $[\tilde{\sigma}_{j_1}, \ldots, \tilde{\sigma}_{j_l}]^T$. In Equation (12), $\Psi_{l,i}$ denotes a set having vectors $\tilde{\sigma}_{j_n}=1/\sigma_{j_n}$ as (l−i) elements and having all possible $$\binom{l}{i}$$

vectors $\tilde{\sigma}_l$ with $\sigma_{j_n}=1/\sigma_{j_n}\sin\theta$ as the remaining i elements. Through combination of Equation (5) and Equation (12), a probability $P_k$ can be found without integration calculation.

Using the found probability equation and the characteristic that the standard deviation $\sigma_k$ and the probability $P_k$ are proportional to each other, it is possible to repeatedly find coefficients $\sigma_1, \ldots, \sigma_K$ corresponding to all desired probabilities $P_1^*, \ldots, P_K^*$. In Table 1 below, a steepest decent algorithm is applied as an example of a method for finding the coefficients.

TABLE 1

Step 1 initialization $\sigma_k(0) = C$ for all k where C: any positive const.

Step 2 for n = 0, ..., N − 1 (arbitrary large integer) UPDATE $\sigma_k(n)$ $$\sigma_k(n+1) = \sigma_k(n) \times \mu^{P_k^* - P_k(n)}$$

where $\left\{ P_k(n) = \right.$ $$\frac{1}{2^{K-1}} \sum_{l=1}^{2\lfloor(K-1)/2\rfloor} \left[ \sum_{i=0}^{\lfloor(K-1-f(l))/2\rfloor} \binom{K-1-l}{2k+f(l)} \right] (-1)^l \sum_{\text{all possible } \Omega_{kj}} \Phi_k(\Omega_{k,j}) \left. \right\}$$

Step 3

$w_k = \sigma_k(N)$

In this case, positive numbers $\mu(>1)$ and N should be appropriately adjusted in order to rapidly and accurately approximate the optimized value $w_k$.

In order to rapidly find the channel capacity allocated to each user, the CV scheduler proposed herein may use the foregoing complementary error function. In this case, an integration equation of Equation (7) is approximated to $$X_k^{sel.av} = \quad (13)$$

$$\frac{1}{P_k^* 2^{K-2}} \sum_{l=0}^{2\lfloor K/2\rfloor - 1} \left[ \sum_{i=0}^{\lfloor(K-2-2\lfloor(l+1)/2\rfloor)/2\rfloor} \binom{K-1-l}{2i+l-2\lfloor(l+1)/2\rfloor+1} \right]$$

$$(-1)^l \sum_{\forall \Omega_{k,l}} \cdot Y_k(\Omega_{k,l})$$

-continued where $$\Upsilon_k(\Omega_{k,l}) = \int_0^\infty \frac{x}{\sigma_k\sqrt{2\pi}} \exp\left(-\frac{x^2}{2\sigma_k^2}\right) \prod_{\forall i \in \Omega_{k,l}} \text{erfc}\left(\frac{x}{\sqrt{2}\,\sigma_i}\right) dx$$

$$\approx \frac{1}{\sigma_k\sqrt{2\pi}} \sum_{i=0}^{l} a_1^i a_2^{l-1} \left(\sum_{\forall \tilde{\sigma}_l \in \Psi_{l,i}} \frac{1}{1/\sigma_k^2 + \tilde{\sigma}_k^T \tilde{\sigma}_k}\right)$$

Figure 3:
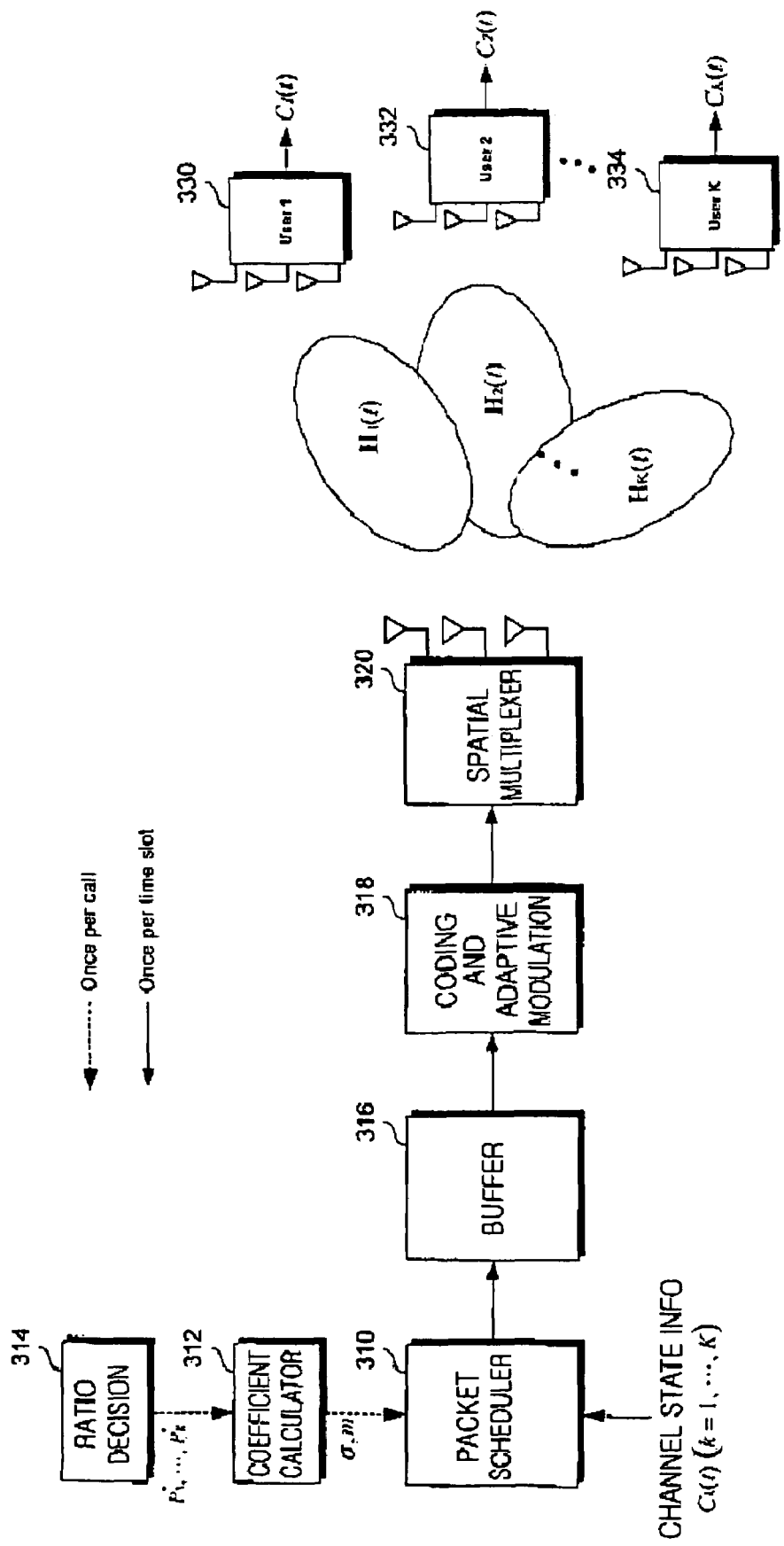
FIG. 3 is a diagram illustrating a structure of a resource scheduling apparatus according to the present invention.

FIG. 3 is a diagram illustrating a configuration of a multi-antenna system employing a scheduling technique according to the present invention.

Referring to FIG. 3, users User 1 330, User 2 332, ..., User K 334 send to a base station channel state information $C_k(t)$ (k=1, ..., K) determined by taking into account channel characteristics. The channel state information $C_k(t)$ (k=1, ..., K) for the individual users is provided to a packet scheduler 310 in the base station.

A ratio decision unit 314 determines a ratio $(P_1^*, \ldots, P_K^*)$ of time slots to be allocated to individual users in accordance with Equation (10). The ratio decision unit 314 provides the determined time slot ratio $(P_1^*, \ldots, P_K^*)$ to a coefficient calculator 312.

The coefficient calculator 312 calculates vectors m and σ, which are coefficients for packet scheduling, taking into account the ratio determined for individual users. The detailed method for calculating the vectors m and σ has been described above. The vectors m and σ calculated by the coefficient calculator 312 are provided to the packet scheduler 310.

The packet scheduler 310 determines resource k*(t) or $k_{CV}(t)$ to be allocated to each individual user by taking into account the channel state information $C_k(t)$ (k=1, ..., K) for the individual users and the vectors m and σ. The packet scheduler 310 can calculate resource to be allocated to each individual user in accordance with Equation (2) or Equation (3).

The resource k*(t) or $k_{CV}^*(t)$ to be allocated to each individual user is provided to a buffer 316. The buffer 316 is a queue for temporarily storing the packets to be transmitted to the individual users. The buffer 316 outputs the stored transmission packets for the individual users with the resources k*(t) or $k_{CV}^*(t)$ allocated to the individual users. The transmission packets output from the buffer 316 are provided to a coding and adaptive modulation unit 318. The packets to be transmitted to the individual users undergo coding and modulation based on a specific modulation scheme in the coding and adaptive modulation unit 318. The modulation scheme is adaptively changed according to the channel state information provided for the individual users.

The modulation symbols to be transmitted to the individual users are multiplexed by a spatial multiplexer 320 with modulation symbol streams, the number of which is equal to the number of transmission antennas. The modulation symbol streams multiplexed by the spatial multiplexer 320 are transmitted to the individual users via their associated transmission antennas.

The multiantenna system supporting multiple users, shown in FIG. 3, has unique channel characteristics $H_1(t)$, $H_2(t)$, ..., $H_K(t)$ between the base station and the users. The users 330, 332 and 334 determine channel state information $C_k(t)$ (k=1, ..., K) by taking into account their own channel characteristics, and feed back to the base station the channel state information.

Figure 4A:
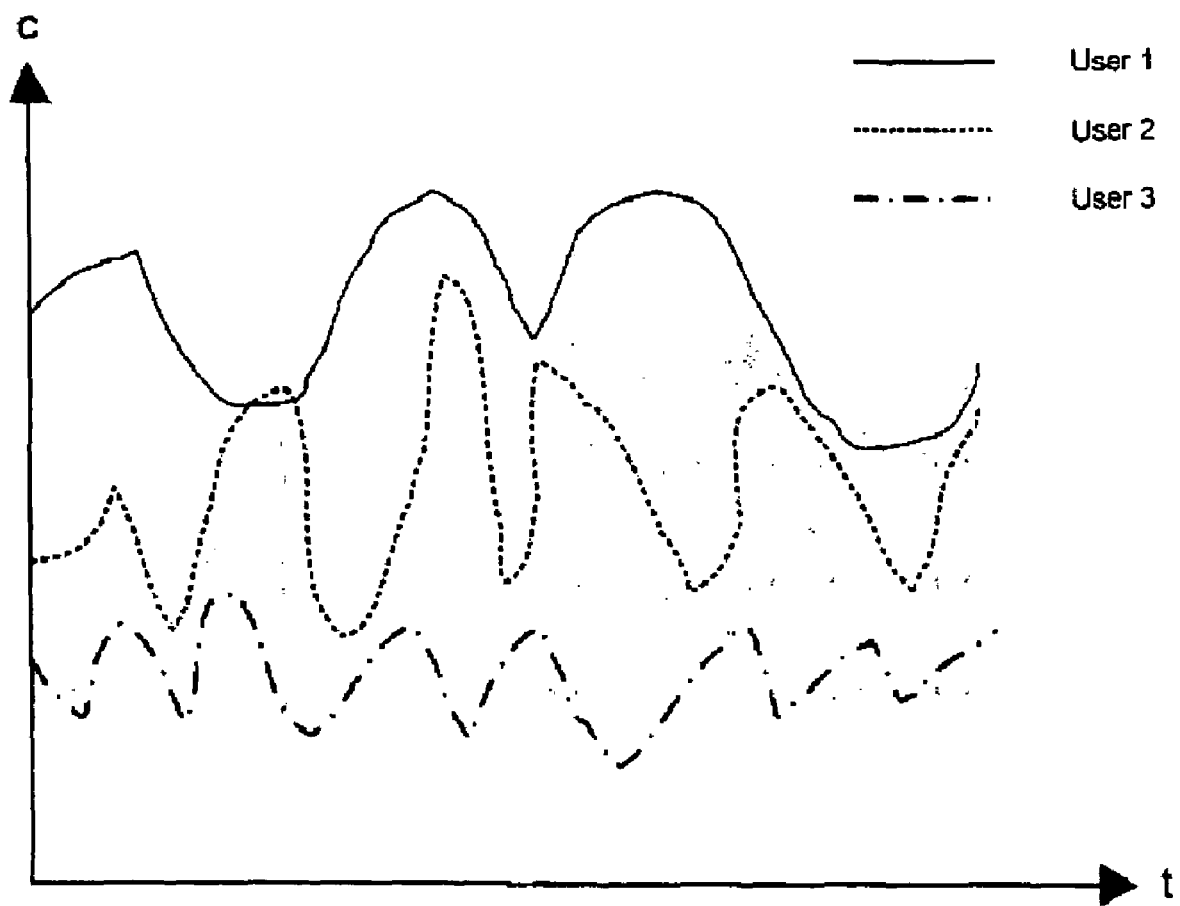
FIG. 4A is a diagram illustrating channel conditions measured for individual users.

FIG. 4A is a diagram illustrating channel conditions measured for individual users. FIG. 4A shows channel capacity that varies according to each individual user with the passage of time. It can be noted in FIG. 4A that the capacity of User 1, shown by a solid line, is the highest, and the capacity of User 3, shown by a dot-dash line, is the lowest.

Figure 4B:
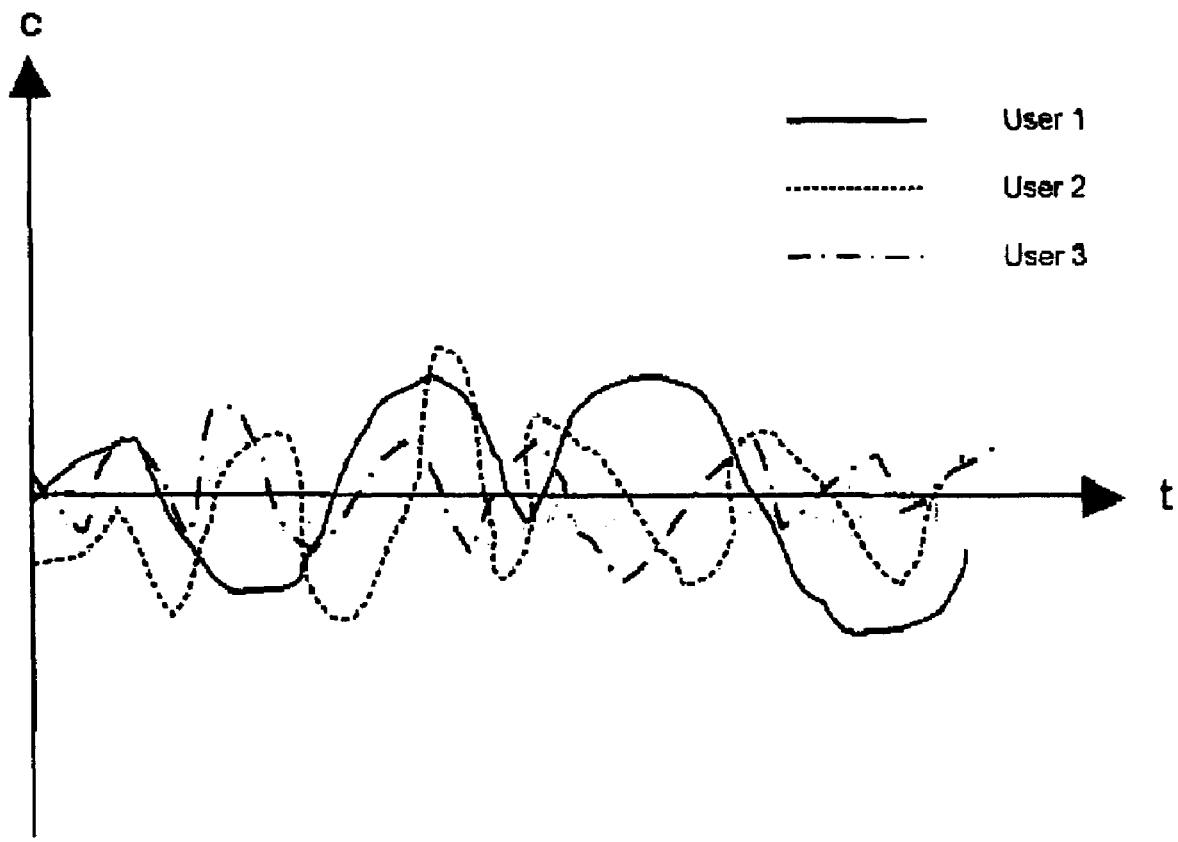
FIG. 4B is a diagram illustrating an example in which a normalized cost function is performed such that the capacities of individual users, shown in FIG. 4A, can commonly change centering around a zero (0) level.

FIG. 4B is a diagram illustrating an example in which a normalized cost function is performed such that the capacities of the individual users, shown in FIG. 4A, can commonly change centering around a zero (0) level. This is done to prevent the channels from being exclusively occupied by a first user which is higher in capacity than other users. It is possible to normalize the capacities of the individual users for a specific reference level as shown in FIG. 4B by assigning different weights to the individual users. In FIG. 3, m is used as the reference level.

Figure 4C:
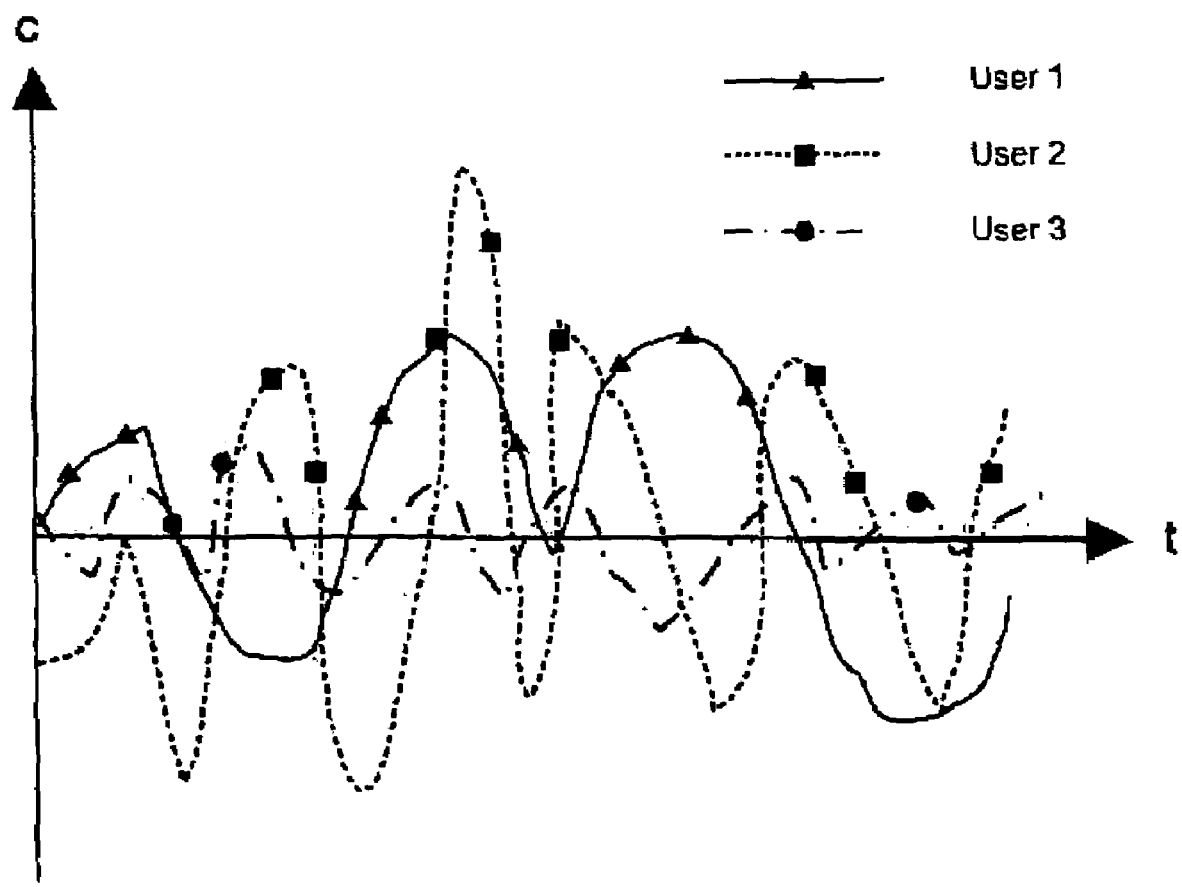
FIG. 4C is a diagram illustrating an example of changing the capacities of individual users by assigning phase weights to the individual users.

FIG. 4C is a diagram illustrating an example of changing the capacities of individual users by assigning phase weights to the individual users. In FIG. 4C, different weights are assigned to the individual users to change the probability that resources are allocated the individual users. In FIG. 3, σ is used as the weight. It is possible to adjust the time slots allocated to the individual users by adjusting the weights σ assigned to the individual users. In FIG. 4C, the weights σ for the individual users are assigned such that an allocation ratio is 8:8:3. It is shown in FIG. 4C that the time slots are allocated to the user having the highest capacity at a particular time.

Figure 5:
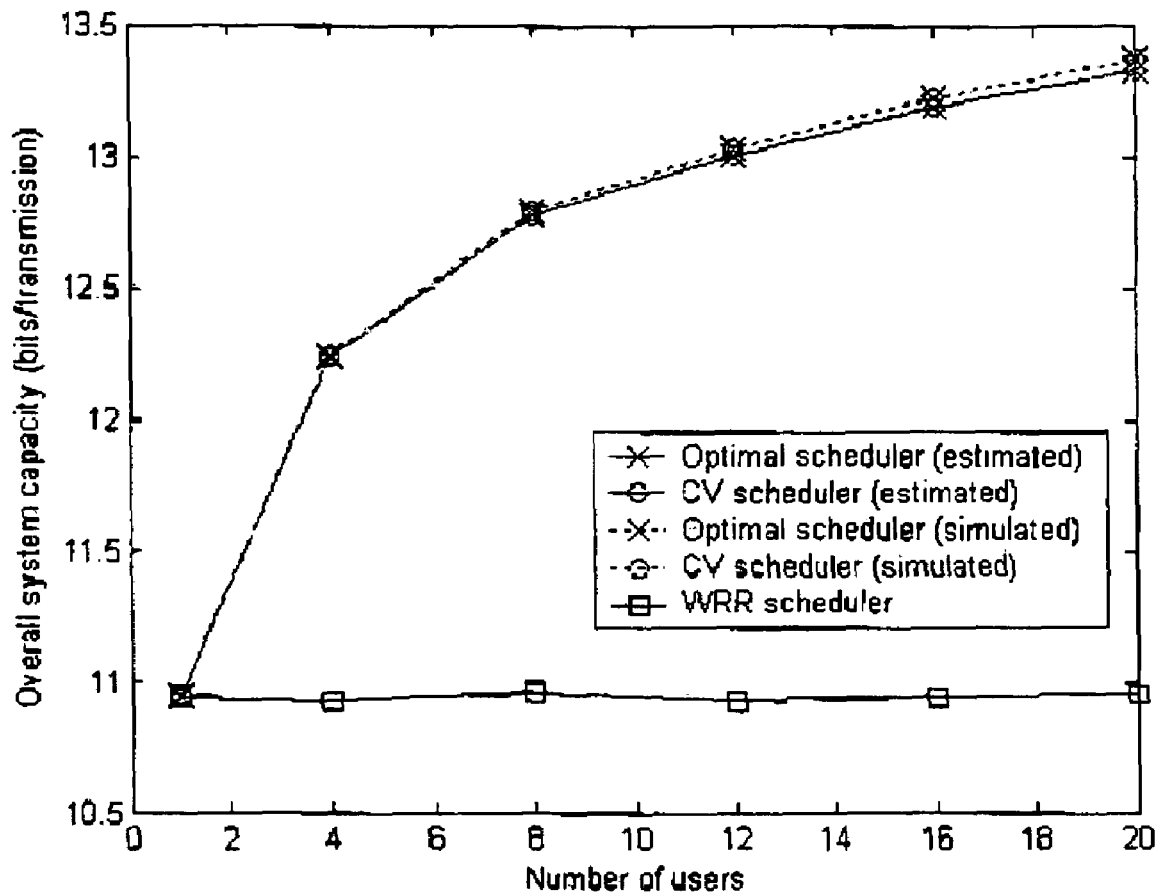
FIG. 5 is a diagram illustrating the simulation results on a multiuser diversity gain according to the present invention.

FIG. 5 is a diagram illustrating the simulation results on a multiuser diversity gain according to the present invention. FIG. 5 shows the computer simulation results on the variation in system capacity with respect to an increase in the number of users and estimated numerical values thereof when 4 transmission and reception antennas are used and average SNRs of users are uniformly distributed over 9 to 11 dB. In this case, the optimal scheduler and the CV scheduler exhibited almost the same performance. That is, it was shown that an increase in the number of users greatly increased the system capacity.

Figure 6:
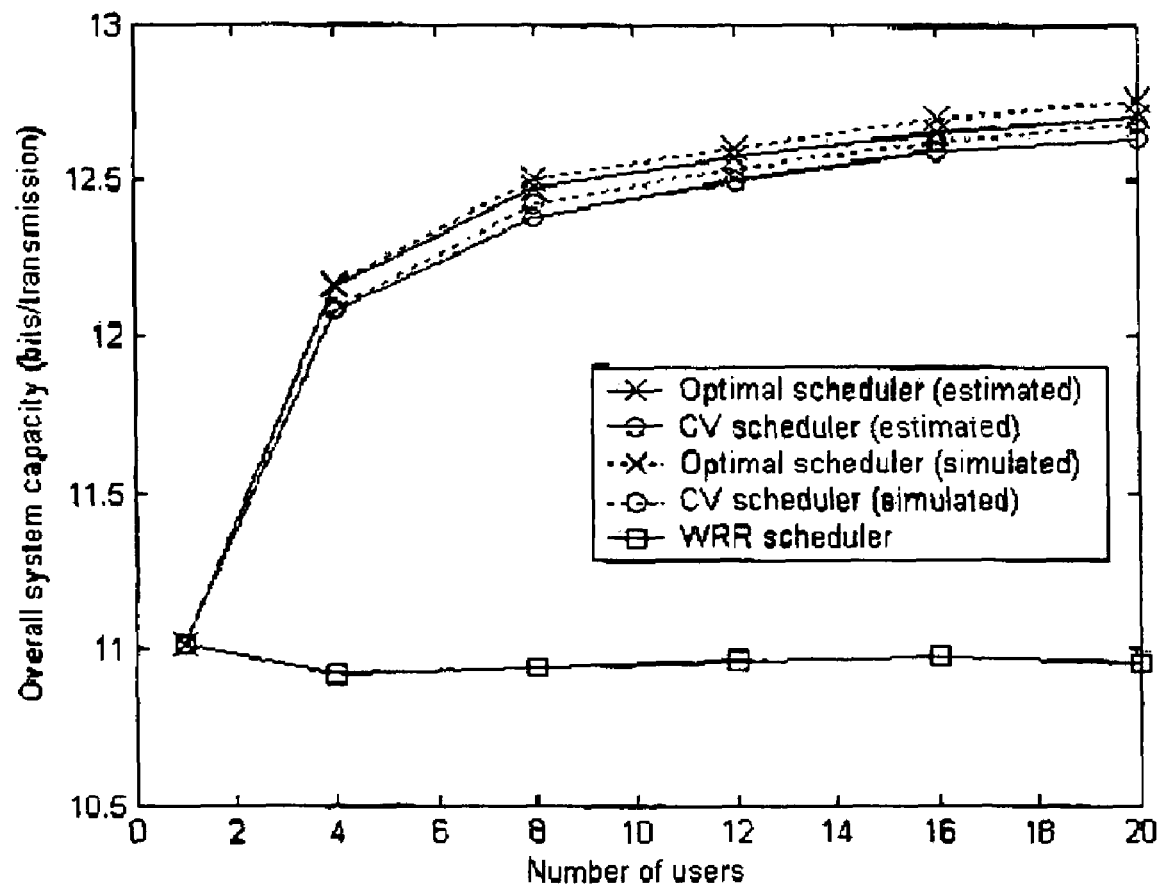
FIG. 6 is a diagram illustrating the simulation results obtained in the environment of FIG. 5, with a desired ratio changed irregularly.

FIG. 6 is a diagram illustrating the simulation results obtained in the environment of FIG. 5, with the desired ratio changed irregularly. Even in this case, both the optimal scheduler and the CV scheduler showed that an increase in the number of users greatly increased the system capacity. In addition, a performance difference between the two schedulers falls within 1% on average.

Figure 7:
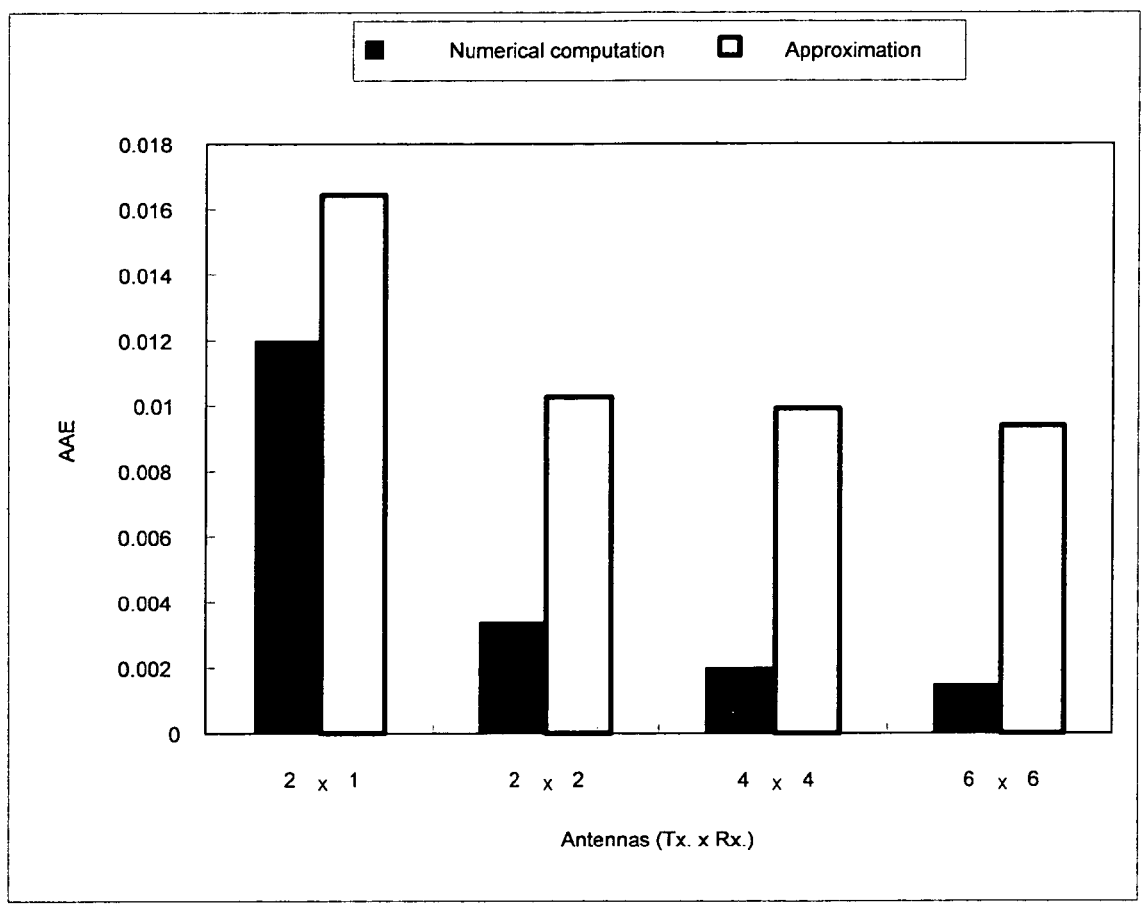
FIG. 7 is a diagram illustrating control performance of a scheduler according to the present invention.

In FIG. 7, Average Absolute Errors (AAE) of the CV scheduler were compared to determine whether time slots were allocated to individual users in a desired ratio. It can be noted from FIG. 7 that an increase in the number of antennas makes Gaussian approximation accurate, reducing the AAE. In addition, it can be seen that when an approximated integration equation is used, an error is maintained to some extent even through the number of antennas increases. The error component is an approximated error of the complementary error function.

When the number of transmission/reception antennas is 2 or greater, the AAE is below 0.01, which is considered to be insignificant in the actual system environment where the statistical channel conditions are subject to periodic change.

In conclusion, the present invention exhibits accurate control performance even in the case where the number of antennas is not large.

As can be understood from the foregoing description, the present invention can provide data service to each user in the ratio desired by the system operator and can increase the total channel capacity of the system by the multiuser diversity. In addition, the average channel capacity allocated to each user is also greater than the average channel capacity available when the scheduling is not performed. That is, no user suffers a decrease in the average channel capacity.

Therefore, the present invention satisfies both scheduling based on the multiantenna technique and the multiuser diversity, and quality-of-service (QoS) guarantee, thereby contributing to maximization of the spectrum efficiency in the multiuser environment.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for allocating resources to individual terminals by a base station including a ratio decision unit, a coefficient calculator, and a packet scheduler in a multiantenna system supporting multiple users, the method comprising:

determining, by the ratio decision unit, a ratio of time slots to be allocated according to a ratio desired by each of the terminals in every specific time slot interval;

calculating, by the coefficient calculator, a channel capacity average and a standard deviation for each terminal according to channel capacity reported from each terminal for a specific time; and determining, by the packet scheduler, based on the determined ratio of time slots, a terminal to which a specific time slot is to be allocated according to the channel capacity average and the standard deviation, calculated for each terminal, and the last reported channel capacity.

2. The method of claim 1, wherein the terminal to which the specific time slot is to be allocated is determined by $$k^*(t) = \arg\max_{k=1,\ldots,K} \sigma_k \times \frac{C_k(t) - C_k^{av}}{C_k^{std}} + m_k$$

where $C_k(t)$ denotes channel capacity of the current time slot, $C_k^{av}$ denotes a channel capacity average of a user k, $C_k^{std}$ denotes a standard deviation for the channel capacity of the user k, and $\sigma_k$ and $m_k$ denote coefficients serving to adjust time slots such that the time slots are allocated to the user k in a desired ratio.

3. The method of claim 2, wherein if a time slot ratio desired to be allocated to the user k is defined by $P_k^*$ (k=1, ..., K), the $\sigma_k$ and the $m_k$ are determined according to coefficients satisfying $P_k(m_1, \ldots, m_K, \sigma_1, \ldots, \sigma_K) = P_k^*$ (k=1, ..., K) in the following equation;

$$P_k(m_1, \ldots, m_K, \sigma_1, \ldots, \sigma_K) = Pr(X_k \text{ is maximal})$$
$$= \int_{-\infty}^{\infty} \frac{1}{\sqrt{2\pi}\,\sigma_k} e^{-\frac{(x-m_k)^2}{2\sigma_k^2}} \prod_{\substack{i=1 \\ i \neq k}}^{K} \left(0.5 + 0.5\,\mathrm{erf}\left(\frac{x-m_i}{\sqrt{2}\,\sigma_i}\right)\right) dx.$$

4. The method of claim 1, wherein the terminal to which the specific time slot is to be allocated is determined by $$k_{CV}^*(t) = \arg\max_{k=1,\ldots,K} \sigma_k \times \frac{C_k(t) - C_k^{av}}{C_k^{std}}$$

where $C_k(t)$ denotes channel capacity of the current time slot, $C_k^{av}$ denotes a channel capacity average of a user k, $C_k^{std}$ denotes a standard deviation for the channel capacity of the user k, and $\sigma_k$ denotes a coefficient serving to adjust time slots such that the time slots are allocated to the user k in a desired ratio.

5. An apparatus for allocating resources to individual terminals by a base station in a multiantenna system supporting multiple users, the apparatus comprising:

a ratio decision unit for determining a ratio of time slots to be allocated according to a ratio desired by each of the terminals in every specific time slot interval;

a coefficient calculator for determining coefficients serving to adjust time slot allocation for each terminal according to the determined ratio of time slots; and a packet scheduler for calculating a channel capacity average and a standard deviation for each terminal according to channel capacity reported from each terminal for a specific time, and determining a terminal to which a specific time slot is to be allocated according to the coefficients, the channel capacity average and the standard deviation, calculated for each terminal, and the last reported channel capacity.

6. The apparatus of claim 5, wherein the packet scheduler determines the terminal to which the specific time slot is to be allocated, in accordance with, $$k^*(t) = \arg\max_{k=1,\ldots,K} \sigma_k \times \frac{C_k(t) - C_k^{av}}{C_k^{std}} + m_k$$

where $C_k(t)$ denotes channel capacity of the current time slot, $C_k^{av}$ denotes a channel capacity average of a user k, $C_k^{std}$ denotes a standard deviation for the channel capacity of the user k, and $\sigma_k$ and $m_k$ denote coefficients serving to adjust time slots such that the time slots are allocated to the user k in a desired ratio.

7. The apparatus of claim 6, wherein if a time slot ratio desired to be allocated to the user k is defined by $P_k^*$ (k=1, ..., K), the coefficient calculator determines the coefficients $\sigma_k$ and the $m_k$ according to coefficients satisfying $P_k(m_1, \ldots, m_K, \sigma_1, \ldots, \sigma_K) = P_k^*$ (k=1, ..., K) in the following equation;

$$P_k(m_1, \ldots, m_K, \sigma_1, \ldots, \sigma_K) = Pr(X_k \text{ is maximal})$$
$$= \int_{-\infty}^{\infty} \frac{1}{\sqrt{2\pi}\,\sigma_k} e^{-\frac{(x-m_k)^2}{2\sigma_k^2}} \prod_{\substack{i=1 \\ i \neq k}}^{K} \left(0.5 + 0.5\,\mathrm{erf}\left(\frac{x-m_i}{\sqrt{2}\,\sigma_i}\right)\right) dx.$$

8. The apparatus of claim 5, wherein the packet scheduler determines the terminal to which the specific time slot is to be allocated, in accordance with, $$k^*_{CV}(t) = \arg\max_{k=1,\ldots,K} \sigma_k \times \frac{C_k(t) - C_k^{av}}{C_k^{std}}$$

(5)

where $C_k(t)$ denotes channel capacity of the current time slot, $C_k^{av}$ denotes a channel capacity average of a user k, $C_k^{std}$ denotes a standard deviation for the channel capacity of the user k, and $\sigma_k$ denotes a coefficient serving to adjust time slots such that the time slots are allocated to the user k in a desired ratio.

\* \* \* \* \*

UNITED STATES PATENT AND TRADEMARK OFFICE
CERTIFICATE OF CORRECTION

PATENT NO. : 7,630,380 B2  Page 1 of 1
APPLICATION NO. : 11/392407
DATED : December 8, 2009
INVENTOR(S) : Chung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Second Day of November, 2010

David J. Kappos
*Director of the United States Patent and Trademark Office*